United States Patent
Smith (10) Patent No.: US 7,038,597 B2
(45) Date of Patent: May 2, 2006

(54) RAILROAD DISTRIBUTED POWER COMMUNICATION SYSTEM AND METHOD

(75) Inventor: Eugene A. Smith, Satellite Beach, FL (US)

(73) Assignee: General Electric Company, Schenectady, NY (US)

(*) Notice: Subject to any disclaimer, the term of this patent is extended or adjusted under 35 U.S.C. 154(b) by 43 days.

(21) Appl. No.: 10/279,338

(22) Filed: Oct. 24, 2002

(65) Prior Publication Data

US 2003/0094545 A1    May 22, 2003

Related U.S. Application Data

(60) Provisional application No. 60/332,135, filed on Nov. 16, 2001.

(51) Int. Cl.
*G08G 1/01* (2006.01)

(52) U.S. Cl. .................. 340/933; 340/902; 340/539.1; 340/531; 340/825.5; 340/825.69; 340/825.72; 246/167; 246/169; 246/187

(58) Field of Classification Search ................ 340/933, 340/901, 902, 988, 438, 536, 538, 825.5, 340/900, 425.5, 531, 539.1, 539.19, 825.69, 340/825.72; 246/167, 169, 187; 301/19, 301/36, 70
See application file for complete search history.

(56) References Cited

U.S. PATENT DOCUMENTS

| | | | |
|---|---|---|---|
| 4,553,723 A | 11/1985 | Nichols et al. | |
| 4,582,280 A | 4/1986 | Nichols et al. | |
| 5,039,038 A | 8/1991 | Nichols et al. | |
| 5,351,919 A * | 10/1994 | Martin | 246/167 R |
| 5,681,015 A | 10/1997 | Kull | |
| 5,720,455 A | 2/1998 | Kull et al. | |
| 5,777,547 A | 7/1998 | Waldrop | |
| 6,322,025 B1 | 11/2001 | Colbert et al. | |
| 6,400,281 B1 | 6/2002 | Darby, Jr. et al. | |
| 6,401,015 B1 | 6/2002 | Stewart et al. | |
| 6,680,918 B1 * | 1/2004 | Haley | 370/282 |

* cited by examiner

*Primary Examiner*—Hung Nguyen
(74) *Attorney, Agent, or Firm*—William Scott Andes; Norman A. Nixon; Beusse, Brownlee, Wolter, Mora & Maire, P.A.

(57) ABSTRACT

A railroad distributed power communication method and system for wireless transceiver units at spaced locations along a train having remote units that may be out of direct communication with the lead unit for indicating that at least one of a plurality of such remote units is in receipt of a command message from the lead unit. The method and system including transmitting a status reply message from each of the plurality of remote units in response to that unit's receipt of the command message. Each of the status reply messages may include at least status information of the respective remote that corresponds to command instructions of the command message. At least one of the status reply messages of one of the other respective remote units may be received at an intermediate unit. The received status reply messages may be compared to the command message to determine whether the respective remote unit has received the command message and/or is following the set of command instructions. A command received status bit may be set in a second status reply message for each respective remote unit having received the command message and/or that is following the set of command instructions. The second status reply message may be decoded by a lead unit to determine whether the command received status bit has been set for a respective remote unit.

27 Claims, 4 Drawing Sheets

Lead Command Message

Remote "X" Status Reply Message

RAILROAD DISTRIBUTED POWER COMMUNICATION SYSTEM AND METHOD

CROSS REFERENCE TO RELATED APPLICATION

This application claims priority to a provisional application filed on Nov. 16, 2001 having application No. 60/332,135, which is incorporated herein by reference.

BACKGROUND OF THE INVENTION

This invention relates in general to a railroad distributed power communication system for controlling the functionality of one or more transceiver units on the locomotives or railcars of a train remote from a lead transceiver unit on a lead locomotive and more specifically to a method and system for verifying that one or more remote transceiver units have received and are responsive to a command message from the lead locomotive.

Communication among mobile assets, such as locomotives and other cars in a train consist, is important to ensure the coordination of various functions of the mobile assets. Functions such as throttle control, braking and direction, for example, are important to coordinate among locomotives during a train consist's operation. Radio frequency schemes may be used for intra-train communication within the consist with various combinations of transmitters, receivers and/or transceivers being distributed among the lead and remote locomotives. During a locomotive distributed power operation the lead or command locomotive may transmit instructions or control information in a command message to one or more remote or controlled locomotives that are located in the back of or behind the lead locomotive within a train consist. On receipt of the command message, the remote locomotives may transmit a reply message to the lead locomotive including the remote locomotives actual status information pertaining to the command message instructions. If the lead locomotive is satisfied that it has received a reply message from all of the remote locomotives then the lead locomotive may declare that all remotes are following the command message instructions. Alternatively, if the lead locomotive does not receive a reply message from each remote locomotive within a certain period of time then the lead locomotive may assume that communication has been lost and that one or more of the remote locomotives is not following the command message instructions. However, the lead locomotive not receiving a status reply message from one or more remote locomotives does not necessarily mean that those locomotives are not following the command message instruction.

For example, locomotive consists traverse a wide range of topographies including mountainous terrain and other areas having physical features, such as tunnels, that may cause a loss of communication among locomotives in the consist. When traveling through such areas the lead locomotive's operator may interpret the lack of a status reply message from a remote locomotive to mean that the remote locomotive did not receive the proper command message information. However, the lead locomotive may not have received the remote locomotive's status reply message because it was lost due to a communication breakdown between the lead locomotive and the remote locomotive. In this respect, the remote locomotive may be following the command message instructions while the operator of the lead locomotive erroneously concludes that the remote locomotive is not following the command message instructions. This situation may cause the operator to take corrective action that could be avoided if the operator knew the remote locomotive was following the command message instructions. Rapid verification that remote locomotives have received a command message and are following command instructions allows for improved operating efficiency of the train consist.

In view of the above, it would advantageous to provide a method and system for verifying that a remote locomotive, or locomotives, is following a set of command message instructions even though the lead locomotive is out of direct communication with the remote locomotive.

BRIEF DESCRIPTION OF THE INVENTION

A method and system for verifying that at least one of a plurality of remote transceiver units that are spaced from and thus may be beyond direct communication with the lead unit is receiving and following a set of command instructions contained in a command message from the lead unit is provided. The system and method comprise transmitting a first respective reply message from each of the plurality of remote units in response to receipt of the command message. Each of the first respective reply messages may contain at least status information of the respective remote. A respective remote unit may receive at least one of the first respective reply messages of the other respective remote units and comparing the received first respective reply messages to the command message to determine whether the respective remote unit is following the set of command instructions. A command received status bit may be set in a respective second reply message for each remote unit following the set of command instructions. The respective second reply message may be decoded to determine whether the command received status bit has been set for a respective remote unit.

DETAILED DESCRIPTION OF THE INVENTION

Figure 1:
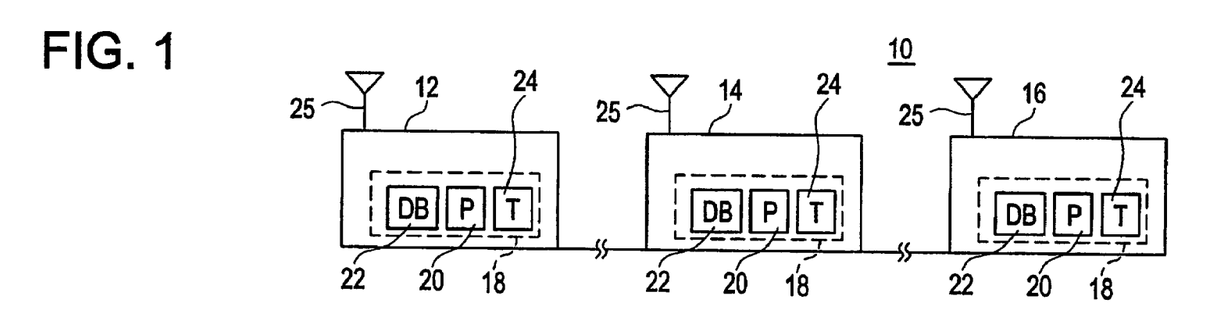
FIG. 1 is a schematic diagram of a portion of a train consist with which exemplary embodiments of the present invention may be implemented.

FIG. 1 is a schematic diagram of a portion of a train consist 10 with which exemplary embodiments of the present invention may be implemented. By way of example, the train consist 10 may include a lead locomotive 12, a first remote locomotive 14 and a second remote locomotive 16. It should be understood that this configuration is used by way of example only and that the train consist 10 may include only one remote locomotive or it may include more than two remote locomotives. A plurality of cars, not shown, may be situation between the locomotives. Each locomotive may include an on-board control system 18 that may include a processor or processing module 20 and a database 22, for example, for managing various systems on-board each locomotive. Each control system 18 may also include respective combinations of radio transmitters, receivers and/or transceivers 24 for enabling radio communication among the locomotives 12, 14 and 16. One or more antennas 25 may be provided for each locomotive to operate with the radio as is known in the art.

In one aspect, the processor 20 of the lead locomotive 12 may be configured to function as the controlling processor of a distributed power communication scheme such as one designed and implement by the assignee of the present invention. The lead locomotive processor 20 may be configured with means for, among other things, transmitting command instructions within a command message to the remote locomotives 14 and 16. A command message may include command instructions to be executed or acted on by the remote locomotives 14 and 16 in compliance with the distributed power communication scheme. Command instructions may include direction commands, traction commands, dynamic braking commands, air brake commands and any other commands relating to electrical and/or pneumatic functions of the train consist 10, for example, that the lead locomotive 12 needs to transmit to at least one of the remote locomotives 14 and 16. The lead locomotive 12 may transmit to all remote locomotives about once every twenty seconds, for example, if there are no command changes and at other times be in a receive mode listening for messages from the remote locomotives. If a command change is determined then the lead locomotive 12 transmits the associated command change instructions immediately within the limits of the protocol of the distributed power communication scheme. In one exemplary embodiment, a minimum time between transmissions may be limited to approximately two seconds. When the lead locomotive 12 transmits a command message it expects a status reply message from each remote locomotive of the train consist 10 indicative of the actual functional status of the respective remote locomotive. If a status reply message is not received directly from all remote locomotives or if the lead locomotive 12 cannot otherwise determine the status of a remote locomotive, then the lead locomotive 12 may retransmit the command message. If the status of a remote locomotive is not determined in response to the retransmitted command message then the lead locomotive 12 may continue to transmit the command message about every two seconds, for example, until the functional status of all remote locomotives may be determined.

The processor 20 of the remote locomotives 14 and 16 may be configured to receive command messages from the lead locomotive 12 and transmit a respective remote status reply message in response thereto. The status reply message may contain data indicative of the respective transmitting remote's actual operational status corresponding to instructions contained in the command message. For example, a remote locomotive's 14 or 16 status reply message may include data indicative of that respective remote's actual status for direction and/or air brake pressure. On receipt of the status reply message by the lead locomotive 12, this information indicates to the lead locomotive 12 that the respective remote is following those command instructions. A remote locomotive's 14 and 16 status reply message may also included data indicative of additional status information of the respective remote such as traction motor current or main reservoir pressure, for example. To ensure that all remote locomotives receive a command message, the processor 20 of each remote locomotive 14 and 16 may be configured to repeat the command message within a respective remote's status reply message. In this respect, if a remote locomotive 14 or 16, or other remote locomotives within train consist 10, cannot receive the command message directly from the lead locomotive 12 then that remote locomotive may receive the command message as part of another remote locomotive's status reply message and act on it accordingly. This may occur when a remote locomotive is out of radio range with the lead locomotive 12. One aspect allows for remote locomotives within the train consist 10 to transmit their respective reply messages within sequential time slots that may be determined by the distributed power communications scheme. For example, after receiving a command message directly from the lead locomotive 12, the first remote locomotive 14 may transmit a status reply message in a first time slot then the second remote locomotive 16 may transmit its status reply message in a second time slot. Each respective status reply message may include a repeat of the command message. If a remote locomotive receives the command message from another remote locomotive's status reply message instead of directly from the lead locomotive's 12 command message, then that remote locomotive may transmit its respective status reply message after all other remote locomotives have transmitted their respective status reply messages.

Figure 2:
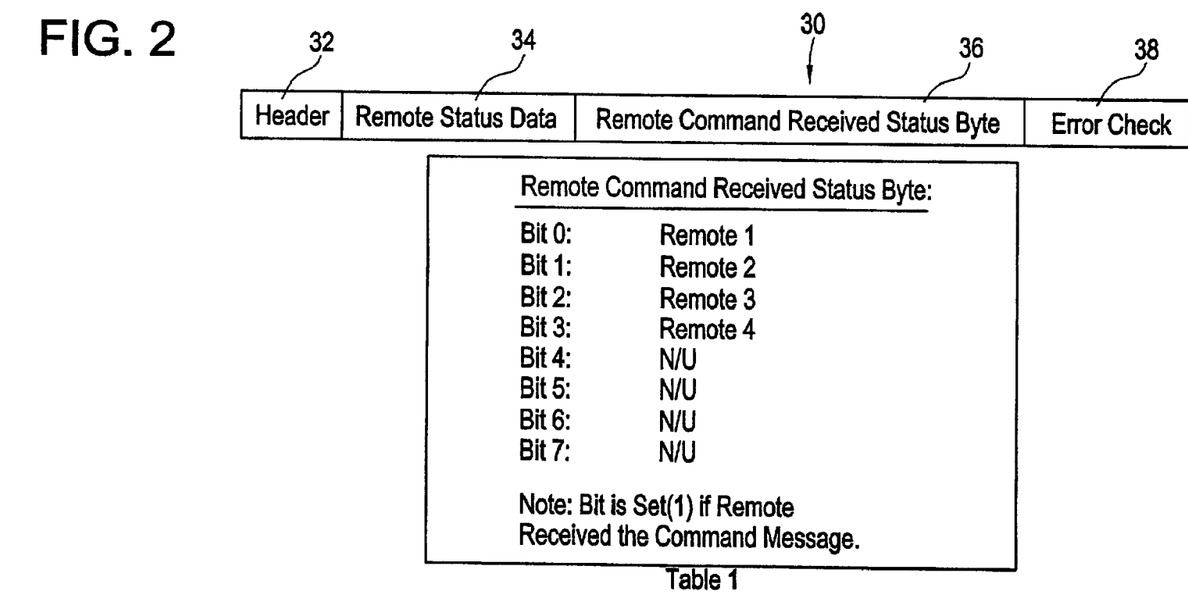
FIG. 2 is an exemplary diagrammatic representation of a message structure including data indicative of a remote mobile asset's status.
Figure 3:
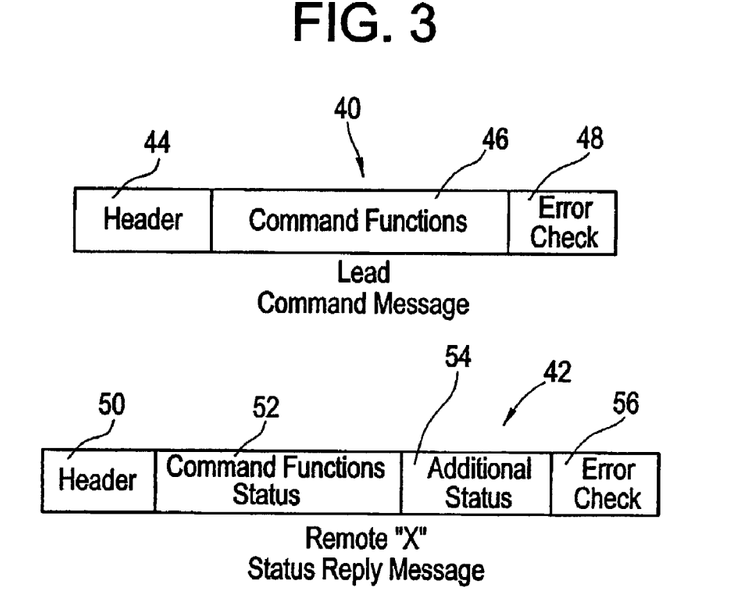
FIG. 3 illustrates exemplary diagrammatic representations of a lead command message and a remote status reply message.

FIG. 2 illustrates a diagrammatic representation of an exemplary structure of a remote status reply message 30 that may include a header portion 32, a remote status data portion 34, a remote command received status byte section 36 and an error check portion 38. An exemplary breakdown of the bits within the remote command received status byte section 36 is illustrated in Table 1. One aspect of the present invention allows for a bit within the remote command received status byte portion 36 to be set at (1) to indicate that a respective remote locomotive has received the command message and/or is following the command instructions contained in the command message. For example, Bit 0 illustrated in Table 1 may be set at (1) to indicate that a first respective remote locomotive, such as locomotive 16, has received the command message and/or is following the command instructions contained in the command message. Similarly, by way of example, Bits 1–3 may be set at (1) to indicate the respective status of three additional respective remote locomotives. Each remote locomotive of the train consist 10 may be equipped with a control system 18 configured to set Bits 0–3 in response to the actual status of other remote locomotives. Processor 20 of remote locomotive 14, for example, may be configured to set Bits 0–3 at (1) in response to receiving the status reply message of remote locomotive 16, comparing that status reply message to the command message and determining whether the remote locomotive 16 is following the command instructions based on the comparison of the status reply message to the command message. FIG. 3 illustrates exemplary structures of a lead command message 40 and a remote "X" status reply message 42, where "X" represents any one remote locomotive of a plurality of remote locomotives within the train consist 10. The lead command message 40 may include a header portion 44, a command functions portion 46 and an error check portion 48. The command functions portion 46 may include data indicative of the control instructions broadcast by the lead locomotive 12 to remote locomotives 14 and 16. The remote "X" status reply message 42 may include a header portion 50, a command functions status portion 52, an additional status portion 54 and an error check portion 56. The command functions status portion 52 may include data indicative of the respective remote "X" locomotive's actual status, such as remote locomotive 16, pertaining to the commands received in the lead command message 40. It will be recognized by those skilled in the art that the specific structures of the messages depicted in FIGS. 2 and 3 may vary to accomplish the same result.

Figure 4:
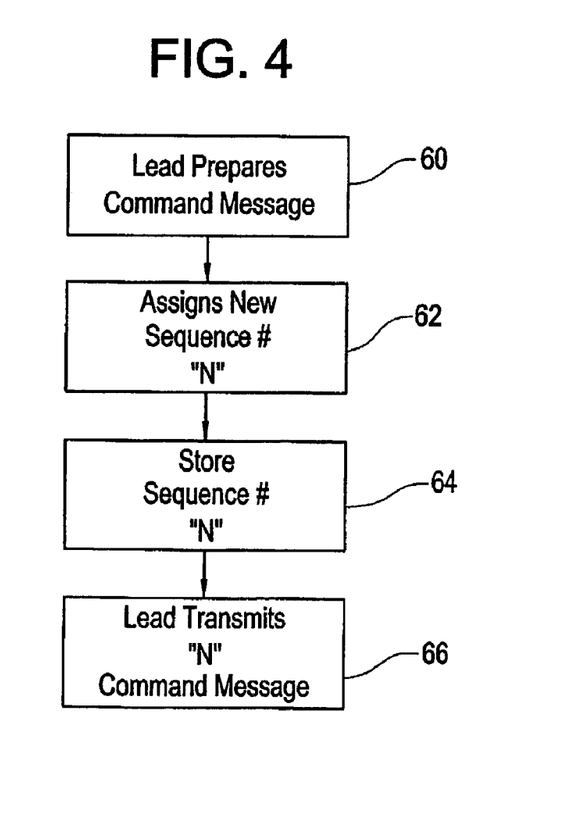
FIG. 4 illustrates a flow diagram of one aspect for transmitting a lead command message.

FIG. 4 illustrates exemplary steps of an aspect for the lead locomotive 12 to transmit or broadcast a command message that may have a lead command message structure 40. Step 60 allows for the lead locomotive 12 to prepare a command message. The command message may be prepared using the lead locomotive's 12 control system 18 in conjunction with the train consist's 10 distributed power communications scheme. A new sequence number "N" may be assigned in step 62 to the command message prepared in step 60. The sequence number "N" may be stored in step 64 in the lead locomotive's 12 database 22. Date indicative of the content of the associated command message, command message "N", may also be stored in database 12. Step 66 allows for the prepared command message "N" to be transmitted or broadcast to all remote locomotives in the train consist 10, such as remote locomotives 14 and 16, by means of the lead locomotive's transmitter 24. The command message "N" transmitted by the lead locomotive in step 66 may be received directly by one or more remote locomotives in step 70 shown in FIG. 5. Instead of being received directly from the lead locomotive 12, step 70 also allows for one or more remote locomotives to receive the command message "N" by virtue of the command message "N" being repeated in another remote locomotive's status reply message. Step 71 allows for the remote locomotive to store data indicative of another remote locomotive's status reply message "N", transmitted in response to that remote locomotive's receipt of command message "N", in database 22, for example. Step 74 allows for a remote locomotive, such as remote locomotive 14, to determine whether it has received the command message "N" directly from the lead locomotive 12 or as part of another remote locomotive's status reply message "N", such as one transmitted by remote locomotive 16. In either case, the command message may be routed to step 75, which allows for a remote locomotive to store the new sequence number "N" whether received directly from the lead locomotive 12 or as part of another remote locomotive's status reply message. Step 76 allows for remote locomotive 14 to store in database 22 data indicative of the content of command message "N". After storing the command message "N", step 78 allows for remote locomotive 14 to process the associated command instructions included in the command message "N" so that remote locomotive 14 is set in the proper state of operation.

Figure 5:
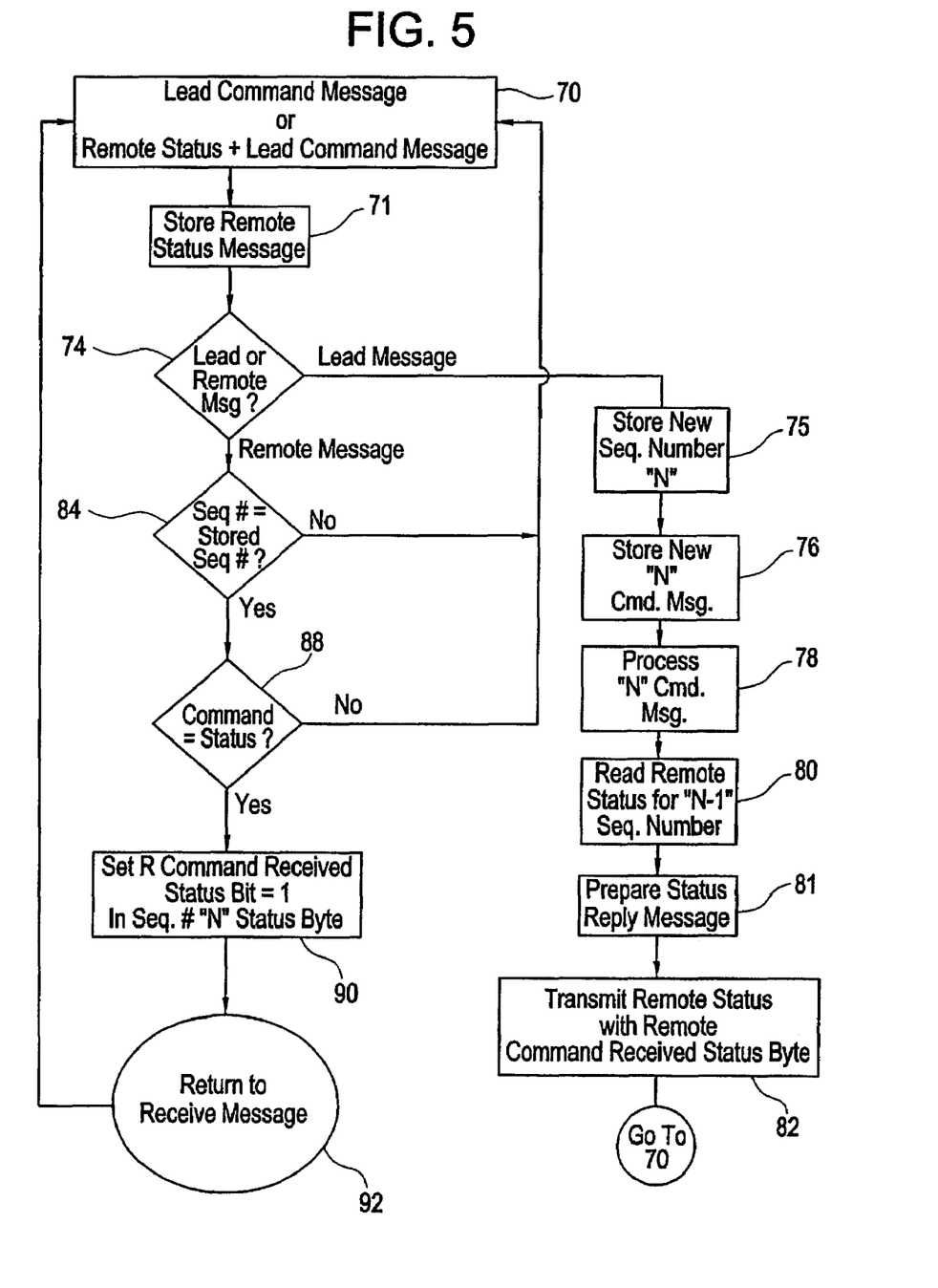
FIG. 5 illustrates a flow diagram of one aspect for receipt of a lead command message by a remote mobile asset.

After the lead command message "N" is processed in step 78, step 80 allows for a remote locomotive, such as remote locomotive 14, to read data stored in its on-board database 22 to determine the command function status of another remote locomotive for a command message "N-1" associated with sequence number "N-1". This may be accomplished using remote locomotive's 14 on-board processor 20. For instance, if remote locomotives 14 and 16 transmit their respective status reply messages in sequential time slots in response to command message "N" then first remote locomotive 14 may transmit its first status reply message to the lead locomotive 12 prior to receiving a first status reply message from the second remote locomotive 16. Thus, the first status reply message transmitted by the first remote locomotive 14 would not include any data indicative of the command function status of remote locomotive 16 pertaining to the command functions of command message "N". On receipt of the first status reply message transmitted by the second remote locomotive 16, which would include the command function status of the second remote locomotive 16 for command message "N", the first remote locomotive 14 may store data indicative of the content of that message in its on-board database 22 in step 71. For subsequent status reply messages transmitted by remote locomotive 14 in response to subsequent command messages having a new sequential number "N", step 80 allows for remote locomotive 14 to read its on-board database 22 and retrieve data indicative of the command function status of the second remote locomotive 16 associated with the command instructions of the command message "N-1". This status may be obtained by reading from database 22 a remote command received status byte 36 stored in step 90. Step 81 allows for remote locomotive 14 to prepare a second status reply message such as status reply message 30, which may contain data indicative of the actual status of locomotive 14 pertaining to command message "N" and of the command function status of remote locomotive 16 pertaining to command message "N-1", for example. Step 82 allows for the remote locomotive 14 to transmit a status reply message 30 to the lead locomotive 12 that includes data indicative of remote locomotive's 16 command function status. This status may be indicated by setting the appropriate bit in the remote command received status byte portion 36 to (1). Step 82 allows for a remote locomotive to transmit back to the lead locomotive 10 in response to its receipt of a command message. After transmitting the status reply message 30 in step 82, remote locomotive 14 may return to step 70 to listen for further command messages broadcast by the lead locomotive 12.

Returning to step 74, if a remote locomotive, such as remote locomotive 14, receives another remote's status reply message 42, such as from remote locomotive 16, and a lead command message 40 repeated within that status message, then step 84 allows for remote locomotive's 14 on-board control system 18 to determine whether the received status reply message includes a sequence number that equals a command sequence number stored in remote locomotive's 14 on-board database 22. The lead locomotive 12 may transmit a sequence number "N" with each command message and each remote locomotive may include the same sequence number "N" in their respective status reply messages. If the sequence numbers are not equal in step 84 then the routine may be exited and/or remote locomotive 14 may continue to listen for further messages in step 70. If the sequence numbers are equal then step 88 allows for determining whether the command functions 46 of the lead command message 40 agree with the command functions status 52 of the respective remote locomotive that transmitted the status reply message 42. This determination may be made by the remote locomotive's 14 on-board control system 18. If the command functions 46 and the command functions status 52 do not agree then the routine may be exited and/or remote locomotive 14 may continue to listen for further messages in step 70. If the command functions 46 and the command functions status 52 do agree then step 90 allows for remote locomotive's 14 on-board control system 18 to set the respective status bit to (1) in the remote command received status byte 36 for the associated sequence number "N". The status byte 36 may be stored in database 22 and included as part of a status reply message that may also be stored in database 22. One aspect allows for respective status bits in byte 36 to be set for multiple remote locomotives within the train consist 10. For example, FIG. 2 illustrates an exemplary remote command received status byte 36 that may include the respective actual status of four remote locomotives. In this respect, Bits 0–3 may be set to (1) to indicate the actual status of up to four respective remote locomotives within the train consist 10. Not all bits must be set before a remote locomotive may transmit a status reply message 30. An alternate embodiment allows for a remote locomotive to set a status bit in its status reply message after receiving and executing a command message to indicate that the remote locomotive setting the status bit is following instructions. After setting the command received status bit in step 90, remote locomotive 14 may return to step 70 to listen for further command and status messages broadcast by the lead locomotive 12 and remote locomotive 16.

Figure 6:
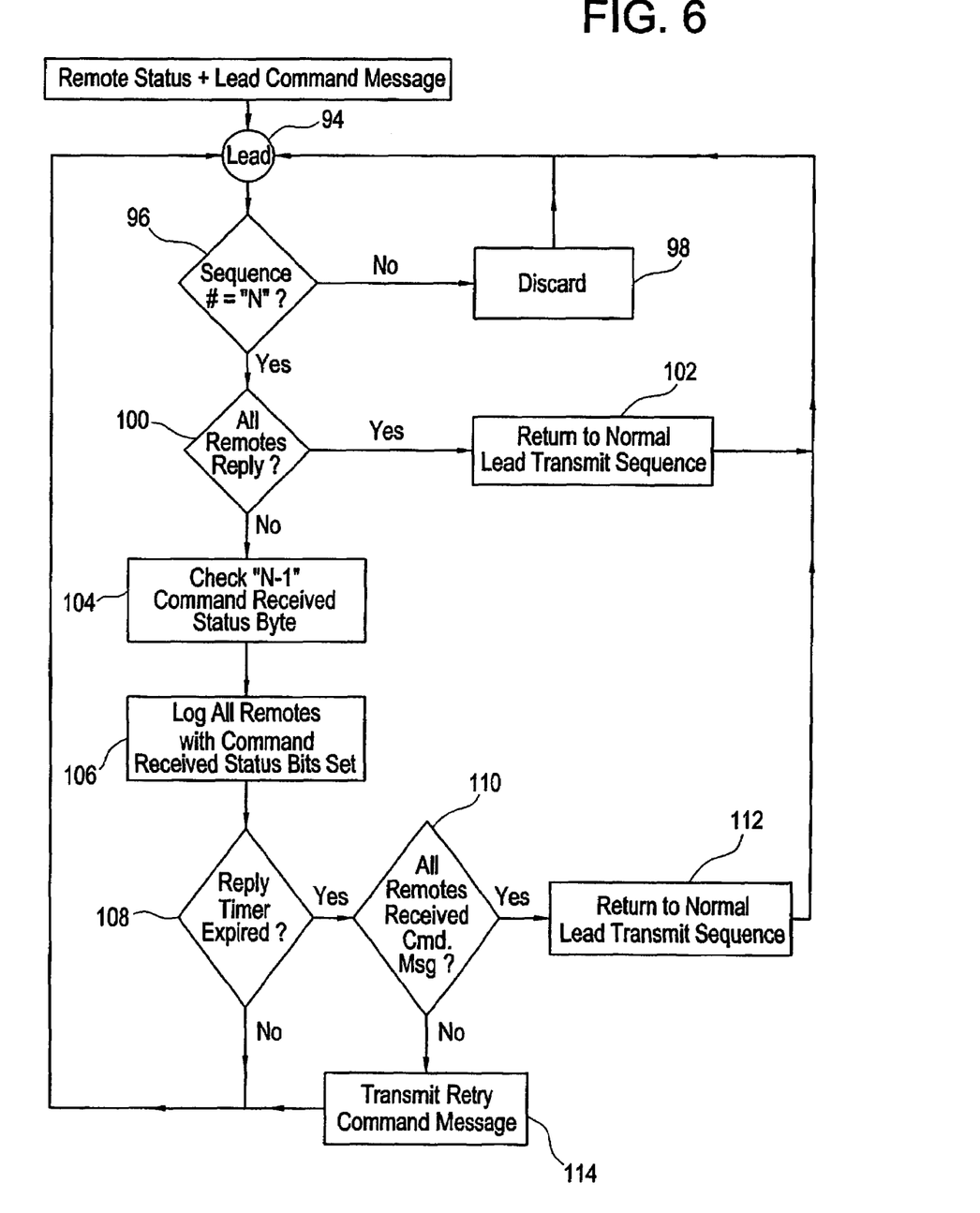
FIG. 6 illustrates a flow diagram of one aspect for receipt of remote status messages by a lead mobile asset.

FIG. 6 illustrates in step 94 that the lead locomotive 12 may receive a remote locomotive's status message that contains the repeated lead command message. The on-board control system 18 of the lead locomotive 12 may then determine in step 96 whether the sequence number of the received message equals the sequence number "N" stored on-board lead locomotive 12 in step 64. If the sequence numbers are not equal then step 98 allows for the received message to be discarded and the lead locomotive 12 may then return to step 94 to listen for further messages. Step 100 allows for determining whether all remote locomotives within the train consist 10 have replied directly to the lead locomotive 12 with their respective command functions status. If they have then step 102 allows for the lead locomotive 12 to return to its normal lead transmit sequence, which may be defined by the protocol of the distributed power communications scheme operable among the locomotives within train consist 10. If all remote locomotives have not replied directly to the lead locomotive 12 in step 102 then step 104 allows for checking the status bits of the "N-1" remote command received status byte 36 contained in the status reply messages that the lead locomotive 12 has received directly from respective remote locomotives in train consist 10. The remote command received status byte 36 is checked to determine if any bits are set to (1), which is indicative of the respective remote locomotives commands function status. Step 106 allows for the lead locomotive 12 to store or log, such as in on-board database 22, all those remote locomotives for which their respective command received status bits in byte 36 have been set to (1). The lead locomotive 12 may then determine in step 108 whether a reply timer has expired. The reply timer may be established as part of the distributed power communications scheme. If the reply timer is not expired then the lead locomotive 12 may return to step 94 to continue listening for messages. If the reply timer has expired then step 110 allows for determining whether all remote locomotives within the train consist 10 have received the command message and/or are following the instructions contained within the command message. If all remote locomotives have received the command message then step 112 allows for the lead locomotive 12 to return to its normal lead transmit sequence, which may be defined in the protocol of the DP communications scheme. A remote locomotive may be considered to have received the command message if the lead locomotive 12 receives a status reply message directly from that remote locomotive or if a remote locomotive's respective status bit is set to (1) in the remote command received status byte 36 of another remote locomotives status reply message. A status reply message including a status byte 36 may be decoded by a respective on-board processor 20 of a remote locomotive to determine whether another remote locomotive has received the command message and/or is following the command message instructions. If all remote locomotives have not received the command message then step 114 allows for the lead locomotive 12 to transmit or broadcast a retry command message. A retry command message may be broadcast with minimal time delay such as about once every two seconds, for example. A communication loss warning or interruption may be activated by the lead locomotive 12 if it does not receive a command functions status message regarding each remote within a predetermined period of time. This period may vary depending on the criticality of the command functions broadcast to the remote locomotives. All remote locomotives may be declared to be following the command instructions if all remote locomotives have received the command message.

One exemplary embodiment allows for a lead transceiver unit 24 of a lead locomotive 12 to function interoperably with an intermediate transceiver unit 24 of remote locomotive 14 and at least one remote transceiver unit 24 of remote locomotive 16 to execute distributed power communication functions for implementing aspects of the present invention. The respective on-board control systems 18 may be configured to allow for the lead transceiver 24 to determine which transceiver units 24 from among a plurality of remote transceiver units 24 located at spaced locations along a train are in receipt of a command message and/or are executing instructions associated with command functions of the command message. One exemplary embodiment allows for the respective on-board control systems 18, the lead, intermediate and remote transceiver units 24 to be configured such that when the lead transceiver unit 24 determines that a respective remote transceiver unit 24 is in receipt of a command message that an associated remote locomotive, such as locomotive 14 and/or 16 for example, is following the command functions of the command message.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A railroad distributed power communication method for use with a plurality of wireless transceiver units at spaced locations along a train for determining which transceiver units from among the plurality of transceiver units are in receipt of a command message, the train having a lead transceiver unit for transmitting command messages and receiving status reply messages, where at least same of the plurality of transceiver units are remote transceiver units spaced from and outside of direct communication with the lead transceiver unit, and the train having at least one intermediate transceiver unit in direct communication with the lead transceiver unit and at least some of the remote transceiver units, the method comprising:

transmitting a command message including a command instruction and a unique sequence number from the lead transceiver unit;

receiving the command message at an intermediate transceiver unit and at least one of the remote transceiver units;

storing data indicative of the command instruction and the unique sequence number of the command message received at the intermediate transceiver unit in a database associated with the intermediate transceiver unit;

transmitting a respective status reply message from each of the at least one remote transceiver units for which the lead transceiver unit needs to verify receipt of the command message, each of the respective status reply messages including data indicative of the unique sequence number of the command message and a command function status of the respective at least one remote transceiver unit that transmitted the respective status reply message;

receiving at least one of the respective status reply messages at the intermediate transceiver unit;

storing data indicative of the command function status and the unique sequence number of the command message included in the received respective status reply messages received at the intermediate transceiver unit in the database associated with the intermediate transceiver unit;

comparing the stored unique sequence number of the command message included in the respective status reply messages received at the intermediate transceiver unit to the stored unique sequence number included in the transmitted command message to determine if there is a match;

if the compared unique sequence numbers match, comparing the command function status of the stored respective status reply messages to the command instruction of tile stored command message to determine which of the respective remote transceiver units is in receipt of the command message;

preparing a second status reply message at the intermediate transceiver unit;

setting a respective command received status bit in the second status reply message for each of the respective remote transceiver units that is in receipt of the command message; and transmitting the second status reply message from the intermediate transceiver unit to the lead transceiver unit.

2. The method of claim 1 further comprising:
decoding the second status reply message to determine which of the respective command received status bits are set to verify to the lead transceiver unit which of the respective remote transceiver units are in receipt of the command message.

3. The method of claim 1 further comprising:
decoding the second status reply message if the lead transceiver unit did not receive at least one of the respective status reply messages directly from the respective remote transceiver unit, the second status reply message decoded to determine which of the respective remote transceiver units is in receipt of the command message.

4. The method of claim 3 further comprising:
waiting a selected period of time for the lead transceiver unit to receive the respective status reply messages directly from each of the respective remote transceiver units before decoding the second status reply message.

5. The method of claim 1 further comprising:
setting a respective command received status bit for at least one of the respective remote transceiver units that is in receipt of a previously broadcast command message.

6. The method of claim 1 further comprising:
decoding the second status reply message by the lead transceiver unit to determine which of the respective remote transceiver units is in receipt of the command message; and if the lead transceiver unit is not in receipt of a respective status reply message from each of the plurality of remote transceiver units for which the lead transceiver unit needs to verify is in receipt of the command message, broadcasting a retry command message from the lead transceiver unit lithe lead transceiver unit determines that at least one of the respective remote transceiver units has not received the command message.

7. The method of claim 6 further comprising:
comparing the sequence number in the received respective status reply messages to the stored sequence number assigned to the command message to determine whether they are equal; and setting the respective command, received status bit only if the compared sequence numbers are equal.

8. The method of claim 1 further comprising:
determining whether the lead transceiver unit has received tile respective status reply message directly from each of the remote transceiver units; and returning to a normal lead transceiver unit transmit sequence if the lead transceiver unit has received the respective status reply message directly from each of the remote transceiver units.

9. The method of claim 8 further comprising:
storing a log in a database on-board the lead locomotive, the log including data indicative of each remote transceiver unit for which a respective command received status bit has been set.

10. The method of claim 9 further comprising:
determining whether a reply timer has expired;

determining whether all of the respective remote transceiver units have received the command message; and returning to the normal lead transmit sequence if the reply timer has expired and all remote transceiver units have received the command message.

11. A method for verifying to a lead locomotive in a train consist that a remote locomotive of the train consist has received a command message including a command instruction and a unique sequence number, the method comprising;

transmitting the command message to a control system configured for repeating messages;

storing data indicative of the command instruction and the unique sequence number of the command message received at the control system in a database associated with the control system;

transmitting a first status reply message from the remote locomotive in response to the remote locomotive's receipt of the command message, the first status reply message including data indicative of a command functions status of the remote locomotive and the unique sequence number of the command message;

receiving the first status reply message at the control system configured for repeating messages;

setting a command received status bit in a second status reply message if the command function status of the remote locomotive and the unique sequence number of the command message transmitted in the first status reply message received by the control system match the command instruction and the unique sequence number of the command message stored in the database associated with the control system;

transmitting the second status reply message from the control system to the lead locomotive; and decoding the second status reply message at the lead locomotive to determine whether the command received status bit has been set to verify to the lead locomotive that the remote locomotive has received the command message.

12. The method of claim 11 further comprising:
declaring by the lead locomotive that the remote locomotive has received the command message if the command received status bit is set.

13. The method of claim 11 further comprising:
activating a communication loss warning by the lead locomotive if the command received status bit is not set.

14. The method of claim 11 further comprising:
decoding the second status reply message only if the lead locomotive does not receive the first status reply message.

15. The method of claim 11 further comprising:
waiting a selected period of time for the lead locomotive to receive the first status reply message before decoding the second status reply message.

16. The method of claim 15 further comprising:
declaring by the lead locomotive that the remote locomotive has received the command message if the command received status bit is set.

17. The method of claim 15 further comprising:
activating a communication loss warning by the lead locomotive if the command received status bit is not set.

18. The method of claim 11 further comprising:
broadcasting a retry command message from the lead locomotive if the lead locomotive does not receive the first status reply message and the status bit is not set in the second status reply message.

19. The method of claim 11 further comprising:
broadcasting the command message from the lead locomotive;
receiving the command message at the control system;
storing data indicative of a content of the command message in a database of the control system; and
providing the control system with a processor configured for comparing the data indicative of the content of the command message to the data of the first status reply message of the remote locomotive.

20. The method of claim 19 wherein the control system is on-board a locomotive of the train consist.

21. A distributed power communication system configured to allow a lead locomotive of a train consist to verify which remote locomotives of the train consist are in receipt of a command message, the system comprising:
a lead control system configured to broadcast the command message;
a remote control system configured to receive the command message and transmit a command received message that includes at least one command received status bit set to indicate whether a remote locomotive is in receipt of the command message;
a transceiver for transmitting the command received message to the lead locomotive so that the lead locomotive may verify which of the remote locomotives are in receipt of the command message;
a database for storing data indicative of a set of command functions included in the command message;
a transceiver for transmitting a respective status reply message from each remote locomotive for which the lead locomotive needs to verify is in receipt of the command message, each respective status reply message including data indicative of a command function status of the respective remote locomotive that transmitted the respective status reply message;
a processing module in the remote control system configured for receiving at least one of the respective status reply messages at a receiving remote locomotive;
a database on-board the receiving remote locomotive for storing data indicative of the command functions status of the received respective status reply messages;
a processing module in the remote control system configured for comparing the stored command functions status and the stored set of command functions to determine which of the respective remote locomotives is in receipt of the command message; and
a processing module in the remote control module configured for setting a respective command received status bit in the command received message for at least one of the respective remote locomotives that is in receipt of the command message.

22. The system of claim 21 wherein the lead control system is on-board the lead locomotive and a remote control system is on-board each of the remote locomotives for which the lead locomotive needs to verify is in receipt of the command message.

23. The system of claim 21 further comprising:
a processing module in the lead control system for decoding the command received message to determine which of the respective command received status bits are set to verify to the lead locomotive which of the respective remote locomotives are in receipt of the command message.

24. The system of claim 23 wherein:
the processing module for decoding is configured to decode the command received message if the lead locomotive did not receive at least one of the respective status reply messages directly from the respective remote locomotive.

25. The system of claim 21 further comprising:
a processing module in the remote control system configured for preparing the command received message to include data indicative of a command functions status of the receiving remote locomotive responsive to the set of command functions included in the command message and for setting the respective command received status bits for at least one of the respective remote locomotives that is in receipt of a previously broadcast command message.

26. The apparatus of claim 21 further comprising:
a processing module in the lead control system configured to assign a sequence number to the command message that is broadcast as part of the command message;
a processing module in the remote control system configured to store the sequence number received in the command message in a respective database on-board each remote locomotive for which the lead locomotive needs to verify is in receipt of the command message; and
wherein the remote control system is configured to repeat the command message and the sequence number in a respective status reply message transmitted by a respective remote locomotive.

27. The system of claim 26 further comprising:
a processing module in the remote control system configured to compare the sequence number in a received respective status reply message to the stored sequence number assigned to the command message to determine whether they are equal and setting the respective command received status bit only if the compared sequence numbers are equal.

* * * * *